(12) United States Patent
Sano

(10) Patent No.: US 10,041,563 B2
(45) Date of Patent: Aug. 7, 2018

(54) IN-LINE FOUR CYLINDER ENGINE

(71) Applicant: YAMAHA HATSUDOKI KABUSHIKI KAISHA, Iwata-shi, Shizuoka (JP)

(72) Inventor: Taketoshi Sano, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 64 days.

(21) Appl. No.: 15/398,810

(22) Filed: Jan. 5, 2017

(65) Prior Publication Data
US 2017/0276213 A1    Sep. 28, 2017

(30) Foreign Application Priority Data
Mar. 23, 2016    (JP) .................... 2016-057893

(51) Int. Cl.
| | |
|---|---|
| F16F 15/26 | (2006.01) |
| F02B 61/02 | (2006.01) |
| F02B 75/20 | (2006.01) |
| F02F 7/00 | (2006.01) |
| F02B 75/18 | (2006.01) |
| F02B 41/04 | (2006.01) |

(52) U.S. Cl.
CPC ............ *F16F 15/265* (2013.01); *F02B 61/02* (2013.01); *F02B 75/20* (2013.01); *F02F 7/0019* (2013.01); *F02B 41/04* (2013.01); *F02B 2075/1816* (2013.01); *F16F 2222/08* (2013.01); *F16F 2230/0011* (2013.01); *F16F 2230/0029* (2013.01); *F16F 2232/02* (2013.01)

(58) Field of Classification Search
CPC ....... F16F 15/265; F16F 15/267; F02B 75/20; F02B 61/02; F02B 2075/1816; F02F 7/0019
See application file for complete search history.

(56) References Cited

U.S. PATENT DOCUMENTS

| | | | |
|---|---|---|---|
| 3,995,610 A * | 12/1976 | Nakamura | ............ F16F 15/265 123/192.2 |
| 4,945,866 A | 8/1990 | Chabot, Jr. | |
| 2011/0277720 A1 | 11/2011 | Jacques et al. | |

FOREIGN PATENT DOCUMENTS

| | | |
|---|---|---|
| DE | 10 2009 058 090 A1 | 6/2011 |
| EP | 0 284 430 A2 | 9/1988 |
| EP | 1 811 199 A1 | 7/2007 |

(Continued)

*Primary Examiner* — Jacob Amick
(74) *Attorney, Agent, or Firm* — Keating and Bennett, LLP

(57) ABSTRACT

An offset in-line four cylinder engine has reduced vibration generated by a secondary inertia couple based on lateral pressures from pistons. A reference line passes through a shaft center of a crankshaft and is parallel or substantially parallel to cylinder axes of four cylinders as viewed in the axial direction of the crankshaft. As viewed in the axial direction of the crankshaft, the direction in which the reference line extends is referred to as first direction, and the direction perpendicular to the first direction is referred to as second direction. A distance between the shaft center of a first balancer shaft and the reference line as measured in the second direction is different from the distance between the shaft center of a second balancer shaft and the reference line as measured in the second direction, or a magnitude of a first unbalancing portion is different from a magnitude of the second unbalancing portion.

7 Claims, 9 Drawing Sheets

(56) References Cited

FOREIGN PATENT DOCUMENTS

| | | |
|---|---|---|
| JP | 56-7536 B2 | 2/1981 |
| JP | 59-42174 B2 | 10/1984 |
| JP | 01-025796 Y2 | 8/1989 |

* cited by examiner

IN-LINE FOUR CYLINDER ENGINE

This application claims the benefit of priority to Japanese Patent Application No. 2016-057893 filed on Mar. 23, 2016. The entire contents of this application are hereby incorporated herein by reference.

BACKGROUND OF THE INVENTION

1. Field of the Invention

The present invention relates to an in-line four cylinder engine, and more particularly to an in-line four cylinder engine including a mechanism to reduce vibration caused by a secondary component of an inertia couple based on lateral pressures from the pistons.

2. Description of the Related Art

Engines include reciprocating engines, for example. A reciprocating engine includes a motion converter to convert reciprocating movements of the piston into rotational movements of the crankshaft (hereinafter referred to as a piston-crank mechanism).

Reciprocating engines include in-line four cylinder engines. An in-line four cylinder engine includes four cylinders arranged in the axial direction of the crankshaft, where the cylinder axes of the four cylinders are parallel or substantially parallel to each other.

In an in-line four cylinder engine, when the pistons in the two cylinders located at the ends of the series of cylinders arranged in the axial direction of the crankshaft are located at the top dead center, the pistons in the other two cylinders are located at the bottom dead center. This reduces vibration caused by the primary component of the inertia force generated as the piston-crank mechanism operates. More specifically, it reduces vibration caused by the primary component of the inertia force due to the reciprocating motion mass of the piston-crank mechanism acting as a translational force as well as vibration caused by the primary component of the same inertia force acting as a couple.

However, an in-line four cylinder engine with the above-described arrangement cannot reduce vibration caused by a secondary component of the inertia force generated as the piston-crank mechanism operates. In view of this, an in-line four cylinder engine includes a balancer to reduce vibration caused by the secondary component of the inertia force generated as the piston-crank mechanism operates. Such a balancer is disclosed in JP Sho56(1981)-7536 A, for example.

JP Sho56(1981)-7536 A discloses an in-line four cylinder engine including a secondary balancer device. According to this publication, the secondary balancer device includes two balancer shafts. The two balancer shafts are positioned parallel or substantially parallel to the crankshaft. The two balancer shafts rotate at a rotational speed twice that of the crankshaft. The two balancer shafts rotate in opposite directions. The two balancer shafts are located at different positions measured in the direction in which the cylinder axes of the four cylinders extend. One of the two balancer shafts is located closer to the pistons than the other balancer shaft is. The other balancer shaft rotates in the direction opposite to that in which the crankshaft rotates.

The secondary balancer device of JP Sho56(1981)-7536 A reduces not only vibration caused by the secondary component of the inertia force generated as the piston-crank mechanism operates acting as a translational force, but also vibration caused by a secondary component of the inertia couple based on the lateral pressures from the pistons (i.e., a secondary inertia couple).

In recent years, engines including a crankshaft having a shaft center offset from the cylinder axis have been proposed (such an engine will be hereinafter referred to as an offset engine). In an offset engine, as viewed in the axial direction of the crankshaft, the shaft center of the crankshaft is not located on the cylinder axis, and the angle or rotation of the crankshaft when the piston moves from its top dead center to its bottom dead center is larger than the angle of rotation of the crankshaft when the piston moves from its bottom dead center to its top dead center. Thus, the expansion time in an offset engine is longer than that in an engine including a crankshaft with a shaft center located on the cylinder axis (hereinafter referred to as a non-offset engine). Further, a reduction in piston speed during expansion means an improvement of heat efficiency. In addition, the inclination of the connecting rod when combustion pressure is high becomes smaller, reducing the lateral pressure from the cylinder from the piston, thus reducing loss. As a result, an offset engine improves fuel efficiency over a non-offset engine.

SUMMARY OF THE INVENTION

As is the case with conventional engines, it is preferable to provide a balancer in an offset engine. However, after research and investigation, the present inventor discovered that it is difficult to reduce vibration caused by the secondary inertia couple based on the lateral pressure from the piston using a conventional balancer.

Preferred embodiments of the present invention reduce vibration generated by a secondary inertia couple caused by the lateral pressures from the pistons of an offset in-line four cylinder engine.

An in-line four cylinder engine according to a preferred embodiment of the present invention includes a motion converter and a balancer. The balancer reduces vibration generated as the motion converter operates. The motion converter includes a crankshaft, four pistons, and four connecting rods, for example. Each of the four pistons is located within an associated one of four cylinders arranged in an axial direction of the crankshaft. Each of the four connecting rods is swingably connected to an associated one of the four pistons. The four connecting rods are swingably connected to the crankshaft. The crankshaft includes four crankpins. Each of the four crankpins is mounted on an associated one of the four connecting rods. In the motion converter, the four cylinders have cylinder axes that are parallel or substantially parallel to each other. In the motion converter, when two of the four crankpins located at ends of a series of crankpins arranged in the axial direction of the crankshaft are at predetermined reference positions, the other two crankpins are located on the side of a shaft center of the crankshaft which is opposite to a side with the reference positions. In the motion converter, as viewed in the axial direction of the crankshaft, the shaft center of the crankshaft is not located on the cylinder axes of the four cylinders. In the motion converter, for each of the four pistons, an angle of rotation of the crankshaft when the piston moves from a top dead center to a bottom dead center is larger than an angle of rotation of the crankshaft when the piston moves from the bottom dead center to the top dead center. The balancer includes a first balancer shaft and a second balancer shaft. The first balancer shaft is positioned parallel or substantially parallel to the crankshaft and rotates at a speed twice that at which the crankshaft rotates. The second balancer shaft is parallel or substantially parallel to the crankshaft and rotates at a speed twice that at which the crankshaft rotates. The second balancer shaft rotates in a direction opposite to that in which the first balancer shaft rotates. A reference line passes through the shaft center of the crankshaft and is parallel or substantially parallel to the cylinder axes of the four cylinders as viewed in the axial direction of the crankshaft. As viewed in the axial direction of the crankshaft, the first balancer shaft is located on a side of the reference line which is opposite to a side with the second balancer shaft. As viewed in the axial direction of the crankshaft, the first balancer shaft is located at a position different from that of the second balancer shaft as measured in a direction in which the reference line extends. The first balancer shaft includes a first unbalancing portion. The first unbalancing portion generates an inertia force as the first balancer shaft rotates. The second balancer shaft includes a second unbalancing portion. The second unbalancing portion generates an inertia force as the second balancer shaft rotates.

In the above-described in-line four cylinder engine, (1) the distance between the shaft center of the first balancer shaft and the reference line may be different from the distance between the shaft center of the second balancer shaft and the reference line as measured in a direction (i.e., a second direction) perpendicular or substantially perpendicular to the direction (i.e., a first direction) in which the reference line extends as viewed in the axial direction of the crankshaft, or (2) the magnitude of the first unbalancing portion may be different from the magnitude of the second unbalancing portion. Or, both (1) and (2) may apply. This reduces vibration generated by the secondary inertia couple caused by the lateral pressures from the four pistons.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

In recent years, offset engines have been proposed to improve fuel efficiency. Similar to conventional engines, it is preferable to provide a balancer in an offset engine. More specifically, in an offset in-line four cylinder engine, it is preferable to provide a balancer to reduce vibration caused by the secondary component of the inertia force generated as the piston-crank mechanism operates. However, after research and investigation, the present inventor found that, in a conventional balancer, it is difficult to reduce a portion of the vibration caused by the secondary component of the inertia force generated as the piston-crank mechanism operates, i.e., the vibration caused by the secondary inertia couple based on lateral pressures from the pistons.

With this in mind, the present inventor investigated the secondary inertia couple caused by the lateral pressures from the pistons. The present inventor discovered that, in an offset engine, the phase of the secondary inertia couple caused by the lateral pressures from the pistons is displaced from that in a non-offset engine. Preferred embodiments of the present invention were made based on these discoveries.

A straddled vehicle according to a preferred embodiment of the present invention will now be described with reference to the drawings. In the present preferred embodiment, a motorcycle will be described as a non-limiting example of the straddled vehicle. The same or corresponding elements throughout the drawings will be labeled with the same characters, and their description will not be repeated.

Figure 1:
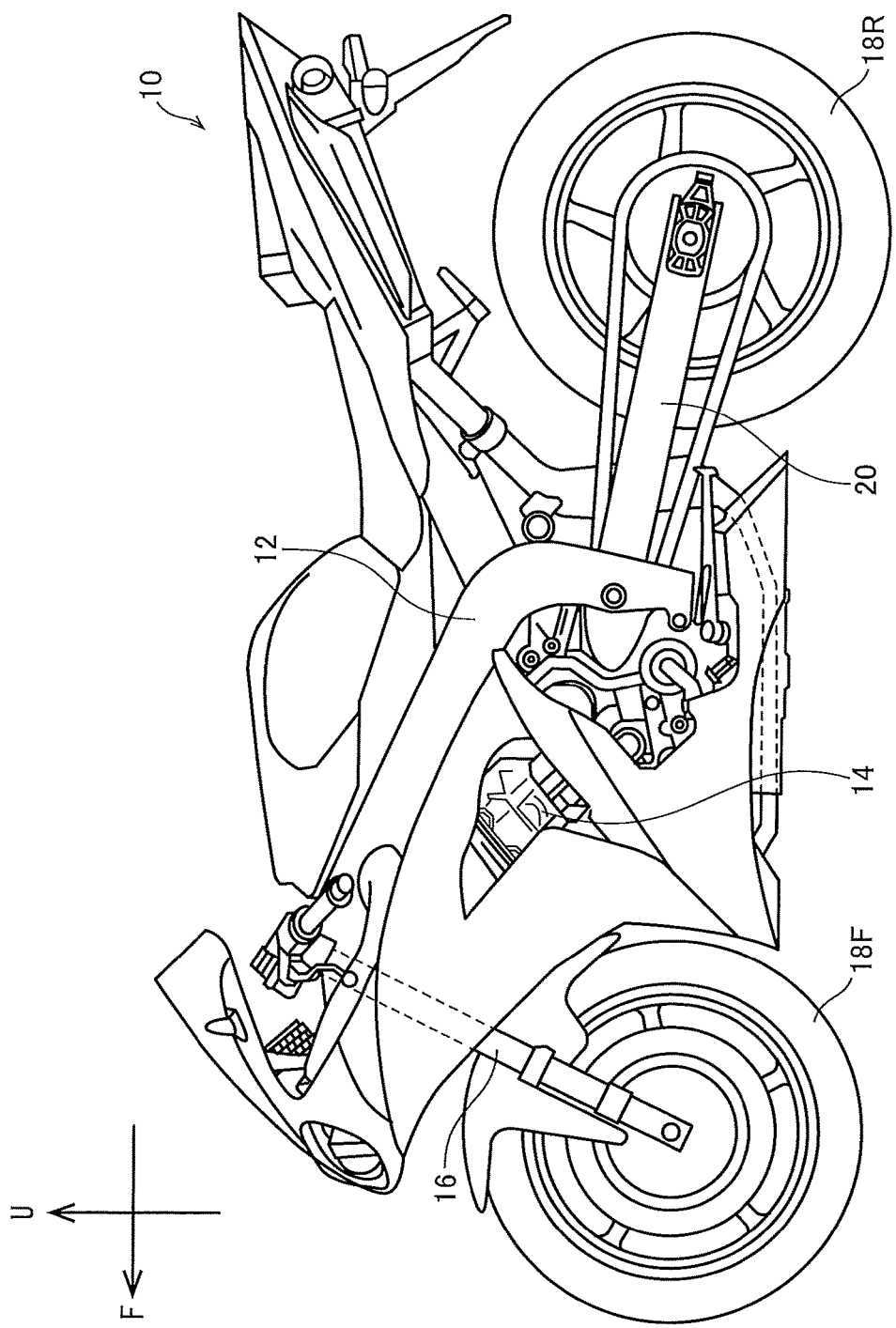
FIG. 1 is a left side view of a motorcycle according to a preferred embodiment of the present invention.

FIG. 1 is a left side view of a motorcycle 10 according to a preferred embodiment of the present invention. Referring to FIG. 1, the motorcycle 10 includes a vehicle body frame 12 and an engine 14.

A front fork 16 is attached to the front portion of the vehicle body frame 12. The front fork 16 rotatably supports a front wheel 18F.

A rear arm 20 is attached to the vehicle body frame 12. The rear arm 20 rotatably supports a rear wheel 18R.

An engine 14 is supported by the vehicle body frame 12. As power from the engine 14 is transmitted to the rear wheel 18R, the rear wheel 18R rotates.

The engine 14 preferably is, for example, an in-line four cylinder engine. The engine 14 includes four cylinders arranged in the left-to-right direction with respect to the vehicle (i.e., the direction perpendicular to the paper surface of FIG. 1). The engine 14 includes a piston-crank mechanism 14A (see FIG. 2).

Figure 2:
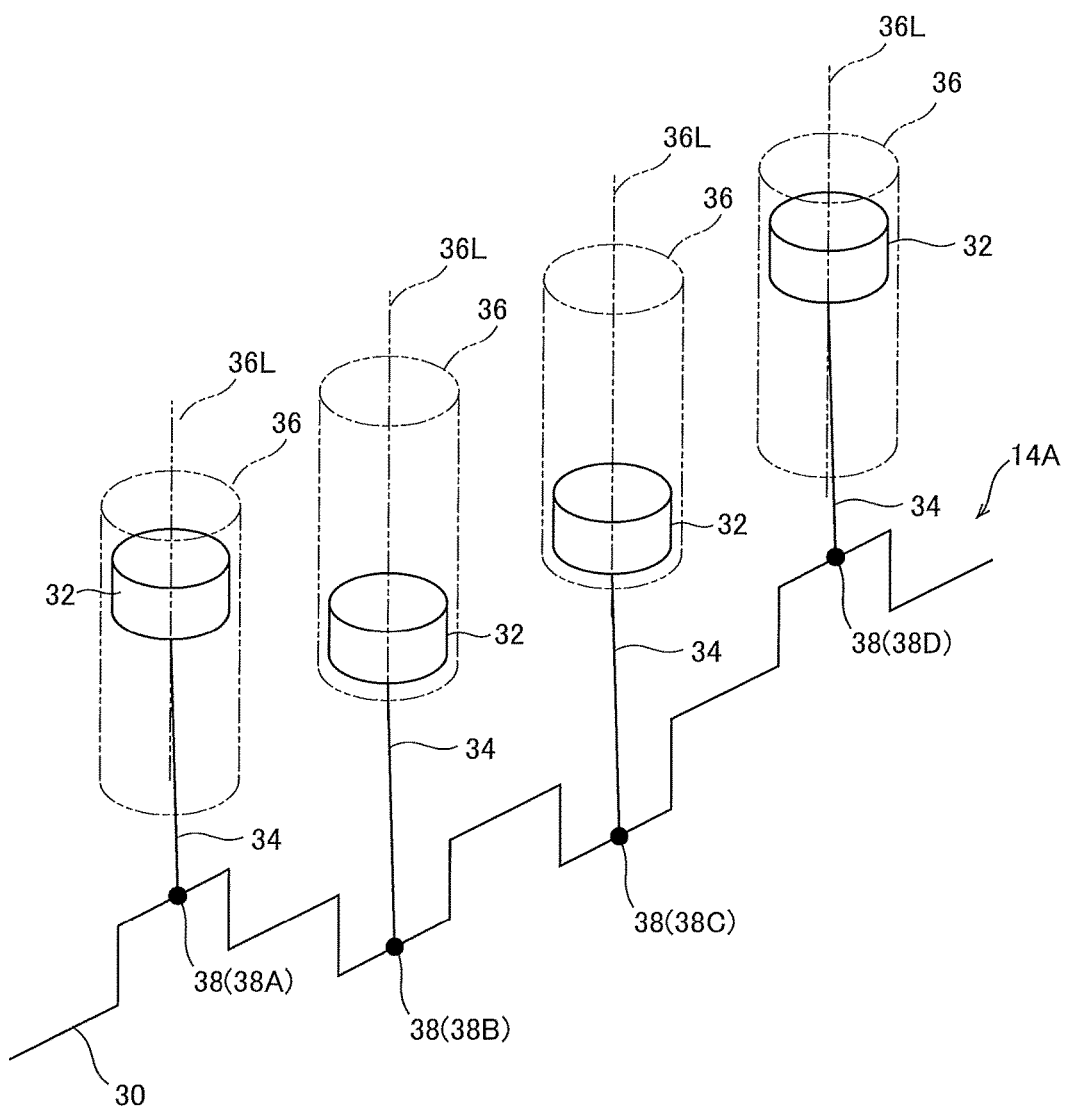
FIG. 2 is a schematic view of a piston-crank mechanism.

The piston-crank mechanism 14A will be described with reference to FIG. 2. The piston-crank mechanism 14A includes a crankshaft 30, four pistons 32, and four connecting rods 34.

Each of the four pistons 32 is located within an associated one of the four cylinders 36 extending in the axial direction of the crankshaft 30. Each piston 32 reciprocates along a central axis of the associated cylinder 36 (hereinafter referred to as cylinder axis 36L). The cylinder axes 36L of the four cylinders 36 are parallel or substantially parallel to each other. Each of the four connecting rods 34 is swingably connected to the associated one of the four pistons 32. The four connecting rods 34 are swingably connected to the crankshaft 30. The crankshaft 30 includes four crankpins 38. Each of the four crankpins 38 is mounted on an associated one of the four connecting rods 34. More specifically, a crankpin 38 is inserted into a hole in the associated connecting rod 34. Thus, each crankpin 38 swingably supports the associated connecting rod 34.

In the piston-crank mechanism 14A, when the two crankpins 38 located at the ends of the series of crankpins arranged in the axial direction of the crankshaft 30 (hereinafter referred to as crankpins 38A and 38D) are located at reference positions, the other two crankpins 38 (hereinafter referred to as crankpins 38B and 38C) are located on the side of the shaft center 30C of the crankshaft 30 (see FIG. 3) which is opposite to the side with the reference positions.

The reference positions will be described with reference to FIG. 3. A reference position is one of the two intersection points of a reference line L1 and the locus of the crankpin 38 as the crankshaft 30 rotates, the one intersection point being closer to the piston 32. The reference line L1 is a straight line that passes through the shaft center 30C of the crankshaft 30 and is parallel or substantially parallel to the cylinder axis 36L of the associated one of the four cylinders 36 as viewed in the axial direction of the crankshaft 30. The position on the side of the shaft center 30C of the crankshaft 30 which is opposite to the reference position is the one of the intersection points which is farther from the piston 32 than the reference position is.

In the piston-crank mechanism 14A, reciprocating movements of the piston 32 are converted into rotating movements of the crankshaft 30. That is, the piston-crank mechanism 14A works as a motion converter.

Figure 3:
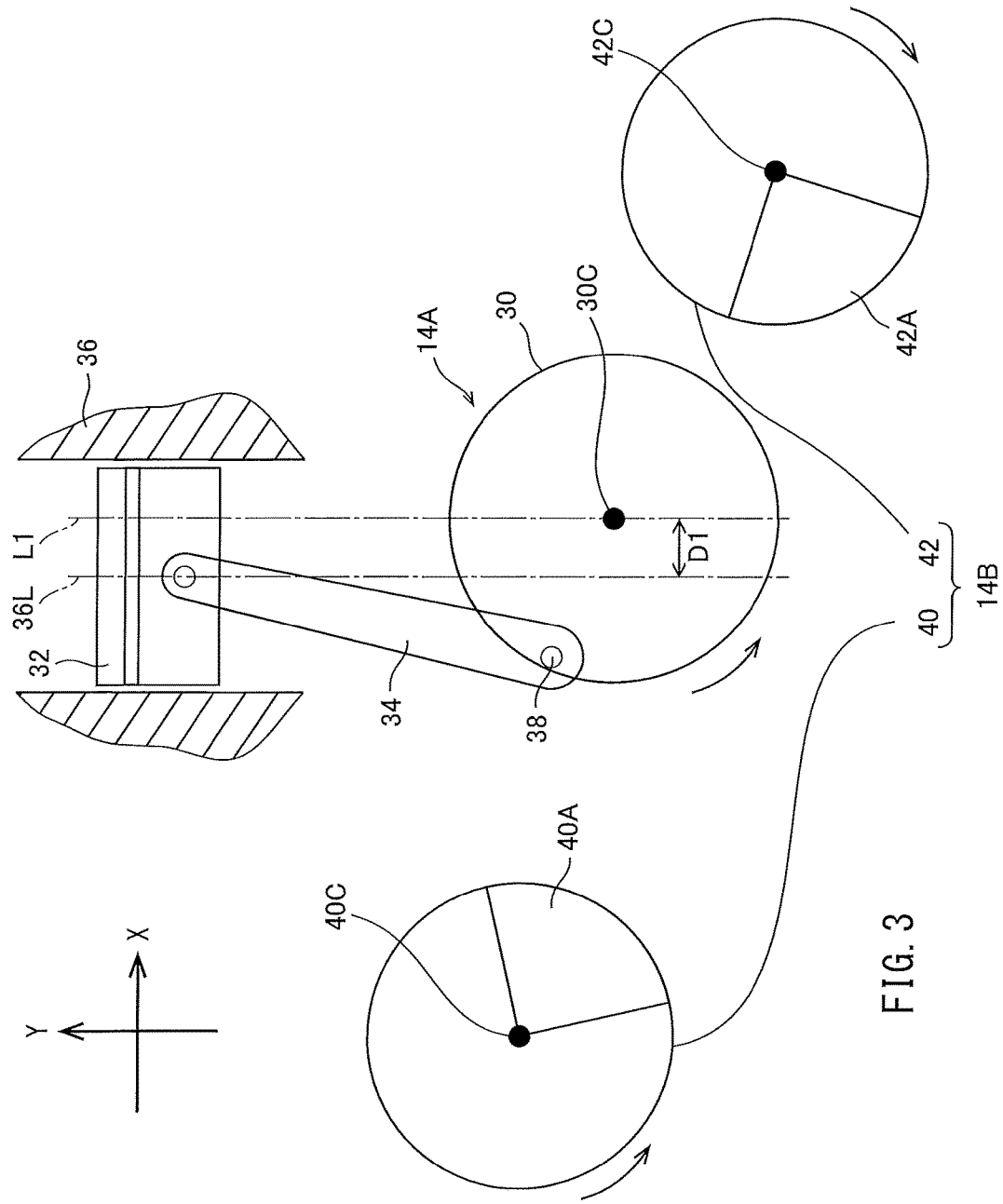
FIG. 3 is a schematic view of the internal structure of the engine.

In the piston-crank mechanism 14A, as shown in FIG. 3, the shaft center 30C of the crankshaft 30 is not located on the cylinder axis 36L as viewed in the axial direction of the crankshaft 30. Thus, the angle of rotation of the crankshaft 30 when the piston 32 moves from its top dead center to its bottom dead center is larger than the angle of rotation of the crankshaft 30 when the piston 32 moves from the bottom dead center to the top dead center. That is, the engine 14 is an offset engine.

Although FIG. 3 only shows the positional relationship between the cylinder axis 36L of one cylinder 36 and the shaft center 30C of the crankshaft 30, in the present preferred embodiment, the crankshaft 30C is in the same positional relationship shown in FIG. 3 with respect to any one of the cylinder axes 36L. That is, the shaft center 30C of the crankshaft 30 is spaced apart from each cylinder axis 36L by distance D1 as measured in the direction perpendicular to the cylinder axis 36L (hereinafter referred to as x-direction).

As shown in FIG. 3, the engine 14 includes, in addition to the piston-crank mechanism 14A, a balancer 14B. The balancer 14B is preferably a double-shaft balancer, for example. The balancer 14B includes a balancer shaft 40 and a balancer shaft 42.

The balancer shaft 40 is positioned parallel or substantially parallel to the crankshaft 30. The balancer shaft 40 has a shaft center 40C. The balancer shaft 40 is rotatable about the shaft center 40C. The balancer shaft 40 may rotate in the same direction as the crankshaft 30, or rotate in the direction opposite to that of the crankshaft 30. In the configuration shown in FIG. 3, the balancer shaft 40 rotates in the same direction as the crankshaft 30. The balancer shaft 40 preferably rotates at a speed twice that of the crankshaft 30. For example, the balancer shaft 40 may rotate together with the crankshaft 30 as a gear provided on the balancer shaft 40 engages with a gear provided on the crankshaft 30 via a gear provided on an intermediate shaft (not shown) provided therebetween. Alternatively, the balancer shaft 40 may rotate together with the crankshaft 30 using a chain wound around a sprocket provided on the balancer shaft 40 and a sprocket provided on the crankshaft 30, for example.

The balancer shaft 40 includes an unbalancing portion 40A. The unbalancing portion 40A generates an inertia force as the balancer shaft 40 rotates.

The balancer shaft 42 is parallel or substantially parallel to the crankshaft 30. The balancer shaft 42 has a shaft center 42C. The balancer shaft 42 is rotatable about the shaft center 42C. The balancer shaft 42 rotates in the direction opposite to that of the balancer shaft 40. In the configuration shown in FIG. 3, the balancer shaft 42 rotates in the direction opposite to that of the crankshaft 30. The balancer shaft 42 preferably rotates at a speed twice that of the crankshaft 30. The balancer shaft 42 may rotate together with the crankshaft 30 as a gear provided on the balancer shaft 42 engages with a gear provided on the crankshaft 30, for example.

The balancer shaft 42 includes an unbalancing portion 42A. The unbalancing portion 42A generates an inertia force as the balancer shaft 42 rotates.

The balancer shaft 42 is located on the side of the reference line L1 which is opposite to the side with the balancer shaft 40. The balancer shaft 42 is located at a position different from that of the balancer shaft 40 as measured in the direction in which the reference line L1 extends, i.e., the direction in which the cylinder axis 36L extends (hereinafter referred to as the y-direction). That is, the shaft center 42C of the balancer shaft 42 and the shaft center 40C of the balancer shaft 40 are located at different positions as measured in the y-direction.

The engine 14 includes the piston-crank mechanism 14A. In the piston-crank mechanism 14A, when the two crankpins 38A and 38D located at the ends of the series of crankpins arranged in the axial direction of the crankshaft 30 are at their reference positions, the other two crankpins 38B and 38C are located on the side of the shaft center 30C of the crankshaft 30 which is opposite to the side with the reference positions. This reduces vibration caused by the primary component of the inertia force due to the reciprocating motion mass of the piston-crank mechanism 14A (i.e., the primary inertia force).

Figure 4:
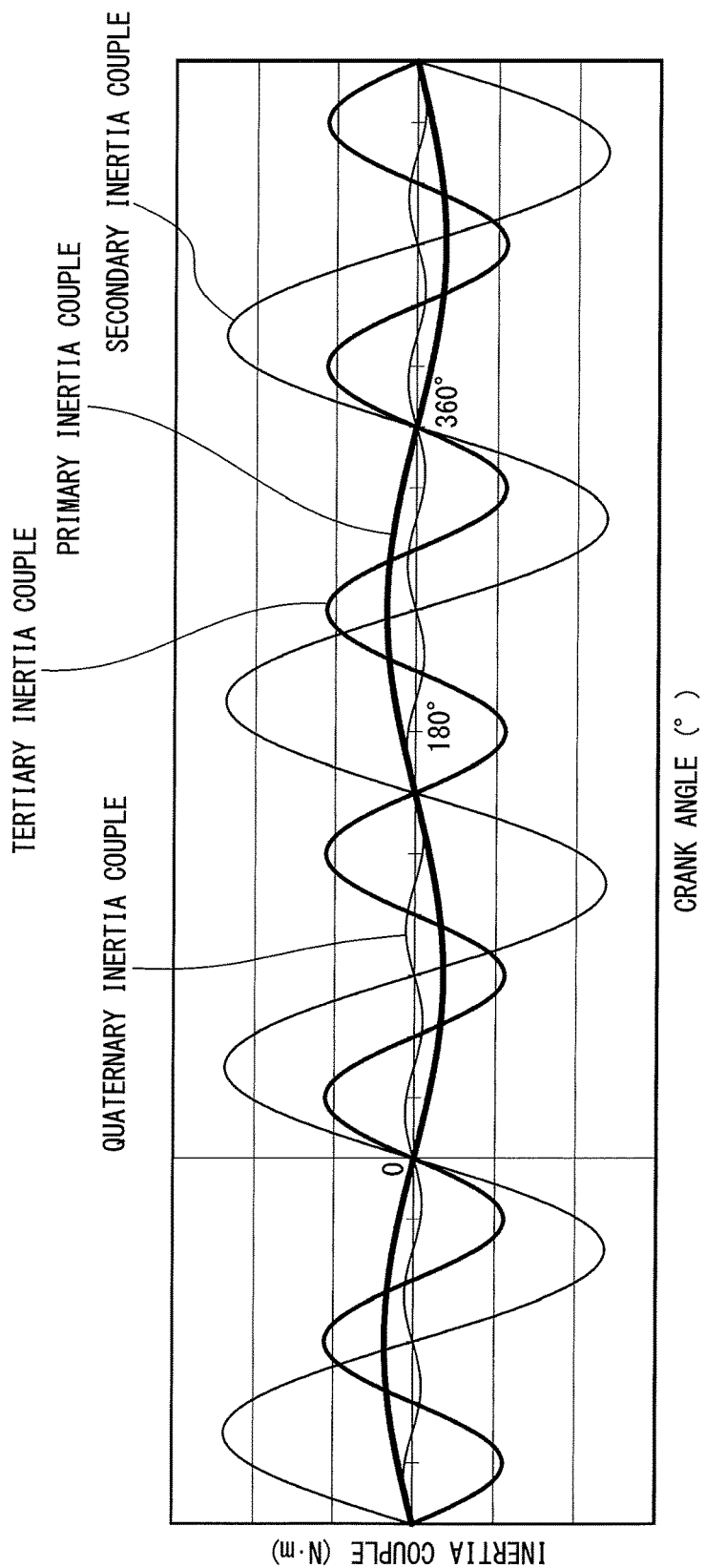
FIG. 4 is a graph illustrating inertia couples in a non-offset engine.
Figure 5:
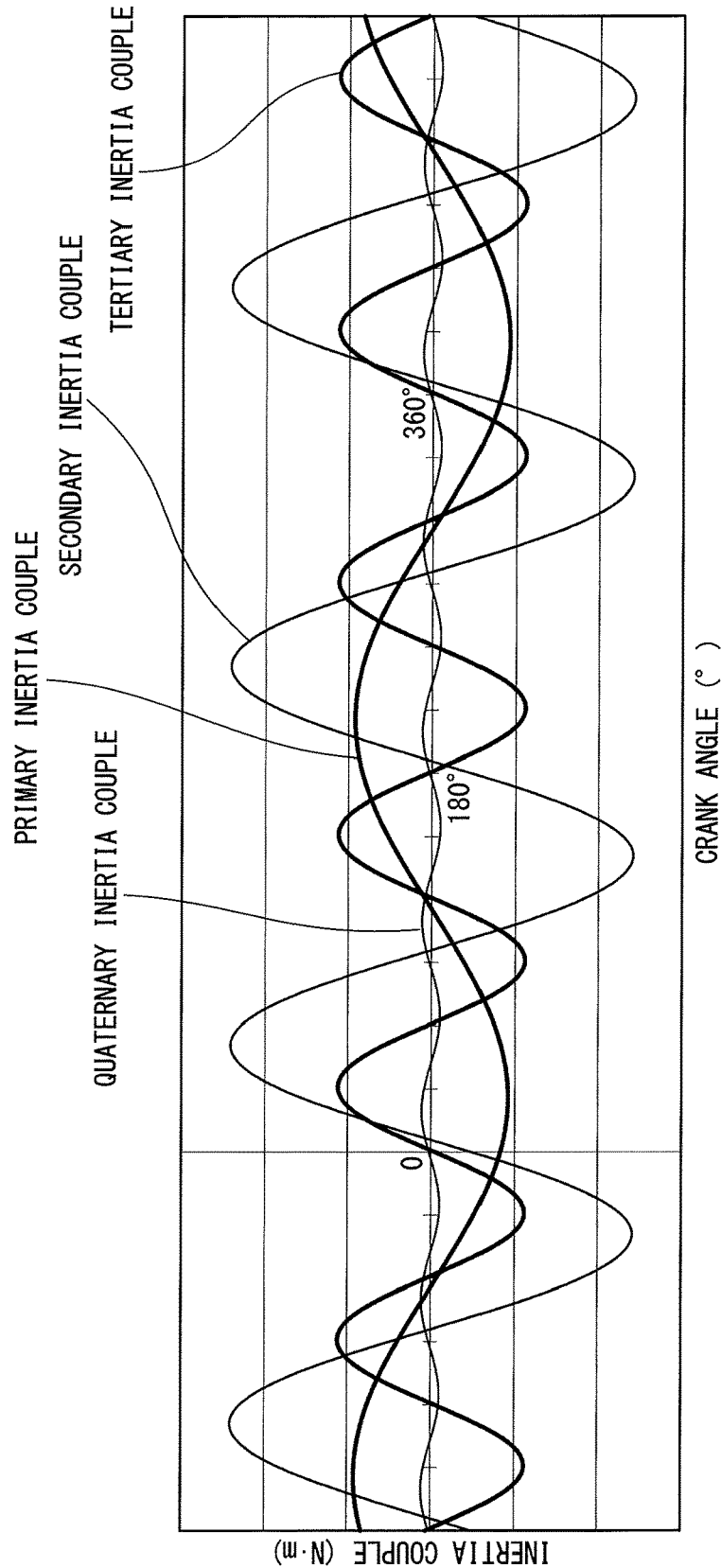
FIG. 5 is a graph illustrating inertia couples in an offset engine.

FIG. 4 illustrates inertia couples due to the lateral pressure from a piston in a non-offset engine. FIG. 5 illustrates inertia couples due to the lateral pressure from a piston in an offset engine, where the offset quantity is about ⅙ of the crank radius. As shown in FIGS. 4 and 5, in the crank offset engine, the phase of the secondary inertia couple due to the lateral pressure from the piston is displaced from that in the non-offset engine. The reasons for this are as follows.

The secondary inertia couple due to the lateral pressure from the pistons is caused by the primary inertia force due to the reciprocating motion mass (i.e., a translational force) and the inclination of the connecting rod. In the offset engine, the phase of the primary inertia force and the phase of the angle of inclination of the connecting rod are displaced. As such, the phase of the secondary inertia couple is also displaced.

As discussed above, the engine 14 is an offset engine. Thus, in the engine 14, the phase of the secondary inertia couple caused by the lateral pressures from the pistons is displaced.

The engine 14 includes the balancer 14B. As discussed above, vibration caused by the secondary inertia couple based on the lateral pressures from the pistons is reduced even though the phase of the secondary inertia couple caused by the lateral pressures from the pistons is displaced.

Settings for the balancer 14B to reduce vibration caused by the secondary inertia couple based on the lateral pressures from the pistons will be described. The balancer 14B preferably is set by the following Steps 1 and 2.

Step 1: balancing the inertia force generated as the balancer 14B operates with the secondary component of the inertia force due to the reciprocating motion mass of the piston-crank mechanism 14A (i.e., a translational force); and Step 2: balancing the inertia force generated as the balancer 14B operates with the secondary inertia couple caused by the lateral pressures from the pistons.

Figure 6:
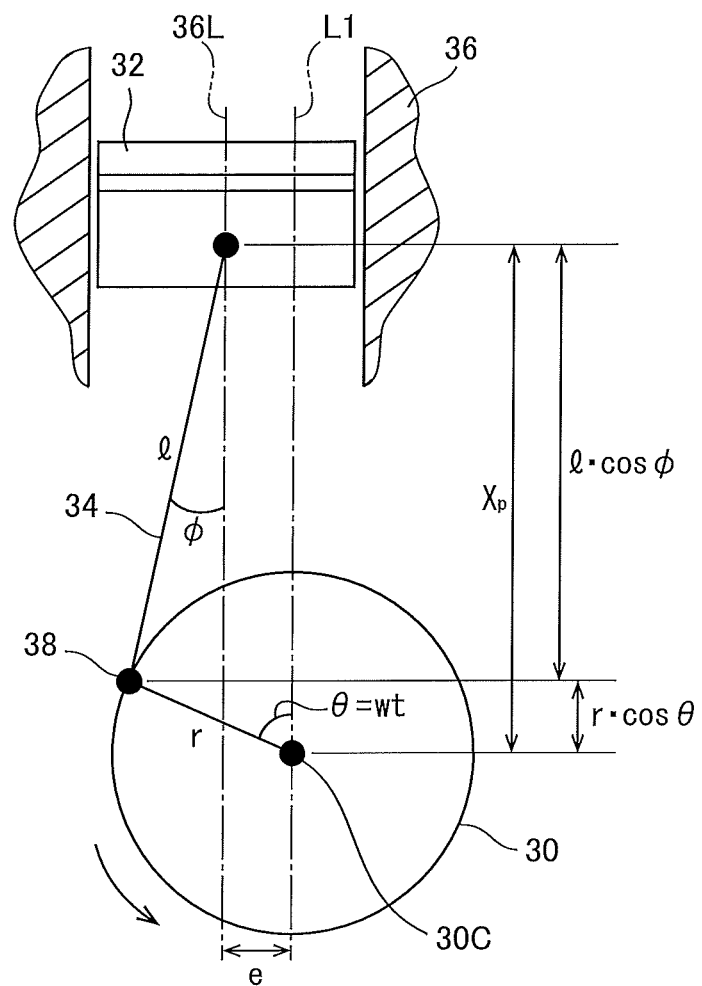
FIG. 6 is a conceptual diagram of an offset engine.

First, the secondary component of the inertia force due to the reciprocating motion mass in an offset engine will be described with reference to FIG. 6. Referring to FIG. 6, the relationship illustrated by the following equation of Formula 1 is established for the offset quantity e, the length of the connecting rod 1, the crank radius r, the angle of crank rotation θ, and the swing angle of the connecting rod φ.

Formula 1

$$e + l \cdot \sin\phi = r \cdot \sin\theta \quad (1)$$

The offset quantity e is the sum of: (A) the offset quantity of the shaft center of the crankshaft relative to a straight line passing through the center of a cylinder as measured in the radial direction and extending in the axial direction of the cylinder (i.e., the cylinder axis); and (B) the offset quantity of the shaft center of the piston pin relative to this straight line. In the following description, the offset quantity e is the offset quantity of (A) only. Accordingly, FIG. 6 illustrates the offset quantity e that is the offset quantity of (A) only. In an engine in which the shaft center of the crankshaft is located on the cylinder axis, suitably the offset quantity e=0. The angle of crank rotation θ is measured relative to the value obtained when the crankpin is at the reference position.

Rearranging the above equation of Formula 1 gives the following equation of Formula 2.

Formula 2

$$\sin\phi = \frac{r}{l} \cdot \sin\theta - \frac{e}{l} \quad (2)$$

Due to the Pythagorean proposition, the following equation of Formula 3 is established.

Formula 3

$$\sin^2\phi + \cos^2\phi = 1 \quad (3)$$

From the above equations of Formulas 2 and 3, the following equation of Formula 4 is derived.

Formula 4

$$\cos\phi = \sqrt{1 - \left(\frac{r}{l} \cdot \sin\theta - \frac{e}{l}\right)^2} \quad (4)$$

The above equation of Formula 4 is developed using the binomial theorem under the following conditions of Formulas 5 to 8.

Formula 5

$$(a+b)^n = \sum_{k=0}^{n} \frac{n!}{k!(n-k)!} \cdot a^{n-k} \cdot b^k = a^n + n \cdot a^{n-1} \cdot b + \frac{n(n-1)}{2 \cdot 1} \cdot a^{n-2} \cdot b^2 + \ldots \quad (5)$$

Formula 6

$$a = 1 \quad (6)$$

Formula 7

$$b = -\left(\frac{r}{l} \cdot \sin\theta - \frac{e}{l}\right)^2 \quad (7)$$

Formula 8

$$n = \frac{1}{2} \quad (8)$$

As a result, the above equation of Formula 4 becomes as follows.

Formula 9

$$\cos\phi = 1 - \frac{1}{2} \cdot \left(\frac{r}{l} \cdot \sin\theta - \frac{e}{l}\right)^2 - \frac{1}{8} \cdot \left(\frac{r}{l} \cdot \sin\theta - \frac{e}{l}\right)^4 + \ldots \quad (9)$$

The first to third terms are extracted from the above equation of Formula 9 and the second and third terms are developed and simplified, which gives the following equation of Formula 10.

Formula 10

$$\cos\phi \approx 1 - \frac{1}{2} \cdot \left(\frac{e}{l}\right)^2 - \frac{1}{8} \cdot \left(\frac{e}{l}\right)^4 + \frac{r \cdot e}{l^2} \cdot \sin\theta + \frac{r \cdot e^3}{2 l^4} \cdot \sin\theta - \frac{r^2}{2 l^2} \cdot \sin^2\theta - \frac{3 r^2 \cdot e^2}{4 l^4} \cdot \sin^2\theta + \frac{r^3 \cdot e}{2 l^4} \cdot \sin^3\theta - \frac{r^4}{8 l^4} \cdot \sin^4\theta \quad (10)$$

Referring to FIG. 6, the displacement $x_p$ of the piston 32 is expressed by the following equation of Formula 11.

Formula 11

$$x_p = r \cdot \cos\theta + l \cdot \cos\phi \quad (11)$$

Calculating the displacement $x_p$ of the piston 32 using the above equations of Formulas 10 and 11 gives the following equation of Formula 12.

Formula 12

$$x_p \approx r \cdot \left\{ \frac{1}{r} - \frac{e^2}{2 l \cdot r} - \frac{e^4}{8 l^3 \cdot r} + \cos\theta + \left(\frac{e}{l} + \frac{e^3}{2 l^3}\right) \cdot \sin\theta - \frac{r}{2l} \cdot \left(1 + \frac{3 e^2}{2 l^2}\right) \cdot \sin^2\theta + \frac{r^2 \cdot e}{2 l^3} \cdot \sin^3\theta - \frac{r^3}{8 l^3} \cdot \sin^4\theta \right\} \quad (12)$$

Simplifying the above equation of Formula 12 using the product-sum formula of trigonometric functions gives the following equation of Formula 13.

Formula 13

$$x_p \approx r \cdot \left(\frac{1}{r} - \frac{e^2}{2 l \cdot r} - \frac{e^4}{8 l^3 \cdot r} - \frac{r}{4 l} - \frac{3 r \cdot e^2}{8 l^3} - \frac{3 r^3}{64 l^3}\right) + r \cdot \sqrt{1 + \left(\frac{e}{l} + \frac{3 r^2 \cdot e}{8 l^3} + \frac{e^3}{2 l^3}\right)^2} \cdot \cos\left(\theta - \tan^{-1}\left(\frac{8 l^2 \cdot e + 3 r^2 \cdot e + 4 e^3}{8 l^3}\right)\right) + r \cdot \left(\frac{r}{4l} + \frac{r^3}{16 l^3} + \frac{3 r \cdot e^2}{8 l^3}\right) \cdot \cos 2\theta - r \cdot \frac{r^2 \cdot e}{8 l^3} \cdot \sin 3\theta - r \cdot \frac{r^3}{64 l^3} \cdot \cos 4\theta \quad (13)$$

The velocity of the piston 32, $v_p$, may be determined by differentiating the displacement $x_p$ with respect to time. If $\theta=\omega t$ in the above equation of Formula 13, the velocity $v_p$ is represented by the following equation of Formula 14.

Formula 14

$$v_p \approx -r\omega \cdot \sqrt{1+\left(\frac{e}{1}+\frac{3r^2 \cdot e}{81^3}+\frac{e^3}{21^3}\right)^2} \cdot \sin\left(\omega t-\tan^{-1}\left(\frac{81^2 \cdot e+3r^2 \cdot e+4e^3}{81^3}\right)\right)-$$
$$r\omega \cdot \left(\frac{r}{21}+\frac{r^3}{81^3}+\frac{3r \cdot e^2}{41^3}\right) \cdot \sin 2\omega t - r\omega \cdot \frac{3r^2 \cdot e}{81^3} \cdot \cos 3\omega t +$$
$$r\omega \cdot \frac{r^3}{161^3} \cdot \sin 4\omega t \quad (14)$$

The acceleration of the piston 32, $a_p$, may be determined by differentiating the velocity $v_p$ with respect to time. Differentiating the above equation of Formula 14 with respect to time gives the following equation of Formula 15.

Formula 15

$$a_p \approx -r\omega^2 \cdot \sqrt{1+\left(\frac{e}{1}+\frac{3r^2 \cdot e}{81^3}+\frac{e^3}{21^3}\right)^2} \cdot \cos\left(\omega t-\tan^{-1}\left(\frac{81^2 \cdot e+3r^2 \cdot e+4e^3}{81^3}\right)\right)-$$
$$r\omega^2 \cdot \left(\frac{r}{1}+\frac{r^3}{41^3}+\frac{3r \cdot e^2}{21^3}\right) \cdot \cos 2\omega t + r\omega^2 \cdot \frac{9r^2 \cdot e}{81^3} \cdot \sin 3\omega t +$$
$$r\omega^2 \cdot \frac{r^3}{41^3} \cdot \cos 4\omega t \quad (15)$$

The inertia force is obtained by multiplying mass by acceleration. Based on the above equation of Formula 15, the inertia force due to the reciprocating motion mass is represented by the following equation of Formula 16.

Formula 16

$$\frac{F}{mr\omega^2}=\frac{-a_P}{r\omega^2} \approx \sqrt{1+\left(\frac{e}{1}+\frac{3r^2 \cdot e}{81^3}+\frac{e^3}{21^3}\right)^2} \cdot \cos\left(\omega t-\tan^{-1}\left(\frac{81^2 \cdot e+3r^2 \cdot e+4e^3}{81^3}\right)\right)+$$
$$\left(\frac{r}{1}+\frac{r^3}{41^3}+\frac{3r \cdot e^2}{21^3}\right) \cdot \cos 2\omega t - \frac{9r^2 \cdot e}{81^3} \cdot \sin 3\omega t - \frac{r^3}{41^3} \cdot \cos 4\omega t \quad (16)$$

Based on the above equation of Formula 16, the secondary component of the inertia force due to the reciprocating motion mass (i.e., the secondary inertia force) can be expressed by the following equation of Formula 17.

Formula 17

$$F2=\left(\frac{r}{1}+\frac{r^3}{41^3}+\frac{3r \cdot e^2}{21^3}\right) \cdot mr\omega^2 \cdot \cos 2\omega t \quad (17)$$

The above equation of Formula 17 is simplified using the equations of Formulas 18 and 19. R in the equation of Formula 18 below denotes the rotational speed of the crankshaft 30 (i.e., the number of rotations per minute).

Formula 18

$$\omega = 2\pi \cdot \frac{R}{60} \quad (18)$$

Formula 19

$$\theta = \omega t \quad (19)$$

As a result, the above equation of the Formula 17 is expressed by the following equation of Formula 20.

Formula 20

$$F2=\left(\frac{r}{1}+\frac{r^3}{41^3}+\frac{3r \cdot e^2}{21^3}\right) \cdot mr\left(2\pi \cdot \frac{R}{60}\right)^2 \cdot \cos 2\theta \quad (20)$$

In the engine 14, when the two crankpins 38A and 38D located at the ends of the series of crankpins arranged in the axial direction of the crankshaft 30 are at their reference positions, the other two crankpins 38B and 38C are located on the side of the shaft center 30C of the crankshaft 30 which is opposite to the side with the reference positions. As such, the secondary inertia force due to a reciprocating motion mass including the piston 32A, the secondary inertia force due to a reciprocating motion mass including the piston 32B, the secondary inertia force due to a reciprocating motion mass including the piston 32C and the secondary inertia force due to a reciprocating motion mass including the piston 32D have the same phase. Thus, the secondary inertia force generated in the engine 14 (i.e., the secondary inertia force due to the reciprocating motion mass) can be expressed by the following equation of Formula 21.

Formula 21

$$F=4\left(\frac{r}{1}+\frac{r^3}{41^3}+\frac{3r \cdot e^2}{21^3}\right) \cdot mr\left(2\pi \cdot \frac{R}{60}\right)^2 \cdot \cos 2\theta \quad (21)$$

The inertia force generated as the balancer shaft 40 rotates will be designated by Ua, and the inertia force generated as the balancer shaft 42 rotates will be designated by Ub. The following equations of Formulas 22 and 23 are suitably satisfied in order that these inertia forces Ua and Ub are in balance with the secondary inertia force F generated in the engine 14, where $\theta=0$.

Formula 22

$$Ua+Ub=F \quad (22)$$

Formula 23

$$Ua=Ub \quad (23)$$

The balancer shafts 40 and 42 preferably rotate at a speed twice that of the crankshaft 30. Ua and Ub can be expressed by the following equation of Formula 24, where kb is the unbalancing quantity (i.e., a coefficient indicating the magnitude of an unbalancing portion) for each of the balancer shafts 40 and 42.

Formula 24

$$Ua = Ub = kb \cdot mr\left(2\pi \cdot \frac{2R}{60}\right)^2 \tag{24}$$

The following equation of Formula 25 can be derived from the above equations of Formulas 22 and 23.

Formula 25

$$Ua = Ub = \frac{F}{2} \tag{25}$$

Simplifying the above equation of Formula 25 using the above equations of Formulas 21 and 24 gives the following equation of Formula 26.

Formula 26

$$kb \cdot mr\left(2\pi \cdot \frac{2R}{60}\right)^2 = 2\left(\frac{r}{1} + \frac{r^3}{4l^3} + \frac{3r \cdot e^2}{2l^3}\right) \cdot mr\left(2\pi \cdot \frac{R}{60}\right)^2 \tag{26}$$

Simplifying the above equation of Formula 26 gives the following equation of Formula 27.

Formula 27

$$kb = \frac{1}{2}\left(\frac{r}{1} + \frac{r^3}{4l^3} + \frac{3r \cdot e^2}{2l^3}\right) \tag{27}$$

Step 1 may be performed by setting the various parameters so as to satisfy the above equation of Formula 27.

Figure 7:
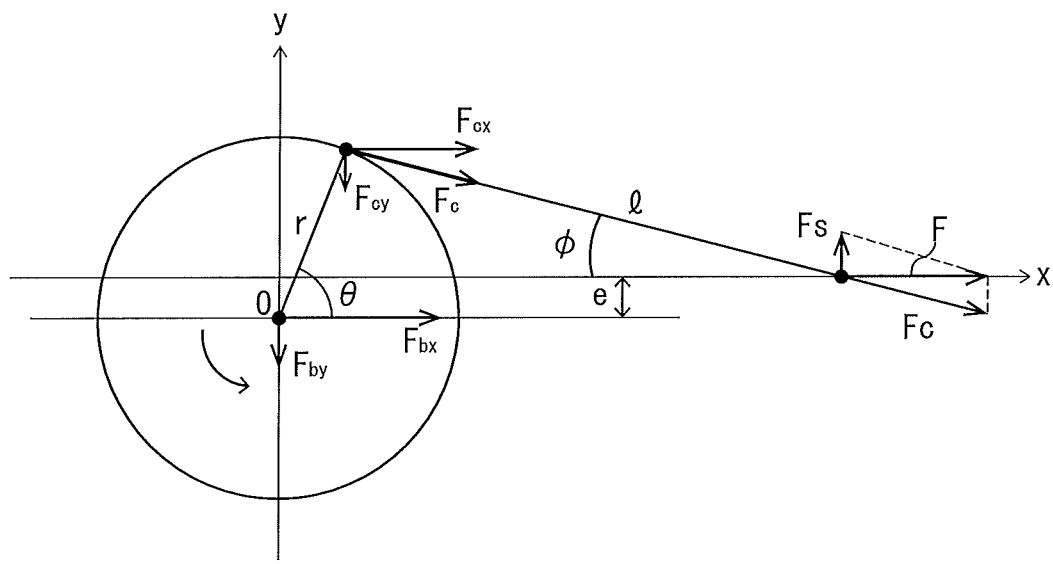
FIG. 7 is a conceptual diagram illustrating the inertia couple in an offset engine.

First, the inertia couple will be described with reference to FIG. 7. In FIG. 7, the y-direction in FIG. 3 is shown as the x-direction and the −x-direction in FIG. 3 is shown as the y-direction.

Referring to FIG. 7, the inertia force F acting on the position of a piston 32 (more specifically, the position of its piston pin) can be resolved into the force Fc acting on the connecting rod 34 and the force Fs acting on the side wall of the cylinder 36. The relationships illustrated by the following equations of Formulas 28 and 29 exist between the forces Fc and F and between the forces Fs and F.

Formula 28

$$F_c = \frac{F}{\cos\phi} \tag{28}$$

Formula 29

$$F_s = F_c \cdot \sin\phi = F \cdot \tan\phi \tag{29}$$

The force acting on the crankshaft 30 can be resolved into a component in the x-direction, Fbx, and a component in the y-direction, Fby, as shown in FIG. 7. Fbx and Fby are determined by the following equations.

Formula 30

$$F_{bx} = F_{cX} = F_c \cdot \cos\phi = F \tag{30}$$

Formula 31

$$F_{by} = F_{cy} = -F_c \cdot \sin\phi = -F \cdot \tan\phi = -F_s \tag{31}$$

Referring to FIG. 7, the forces Fs and Fby form a couple. As will be apparent from the above equations of Formulas 30 and 31, the above couple is caused by the inertia force acting on the piston 32. Such an inertia force will be hereinafter referred to as inertia couple. The inertia couple Mrz can be determined by the following equation.

Formula 32

$$Mrz = F \cdot \tan\phi(r \cdot \cos\theta + 1 \cdot \cos\phi) \tag{32}$$

Simplifying the right side of the above equation of Formula 32 gives the following equation.

Formula 33

$$Mrz = F \cdot (r \cdot \cos\theta \cdot \sin\phi + 1 \cdot \sin\phi \cdot \cos\phi) \cdot \frac{1}{\cos\phi} \tag{33}$$

Referring to FIG. 7, the following equation is derived.

Formula 34

$$1 \cdot \sin\phi = r \cdot \sin\theta - e \tag{34}$$

Simplifying the above equation of Formula 33 using the above equation of Formula 34 gives the following equation.

Formula 35

$$Mrz = F \cdot r \cdot \frac{\sin(\theta + \phi)}{\cos\phi} - F \cdot e \tag{35}$$

Referring to FIG. 7, the position $x_p$ of the piston 32 is represented by the above equation of Formula 11.

Differentiating the above position $x_p$ with respect to time t where $\theta = \omega t$ and $\varphi$ is a function of time t (i.e., $\varphi = \varphi(t)$) gives the following equation.

Formula 36

$$V_p = \frac{dx_p}{dt} = -(r \cdot \omega \cdot \sin\theta + 1 \cdot \phi' \cdot \sin\phi) \tag{36}$$

Differentiating both sides of the above equation of Formula 34 with respect to time t gives the following equation.

Formula 37

$$1 \cdot \phi' \cdot \cos\phi = r \cdot \omega \cdot \cos\theta \tag{37}$$

Simplifying the above equation of Formula 37 gives the following equation.

Formula 38

$$1 \cdot \phi' = \frac{r \cdot \omega \cdot \cos\theta}{\cos\phi} \tag{38}$$

Simplifying the above equation of Formula 36 using the above equation of Formula 38 gives the following equation.

Formula 39

$$V_p = -r \cdot \omega \cdot \frac{\sin(\theta + \phi)}{\cos\phi} \tag{39}$$

Simplifying the above equation of Formula 39 gives the following equation.

Formula 40

$$r \cdot \frac{\sin(\theta + \phi)}{\cos\phi} = -\frac{v_p}{\omega} \tag{40}$$

Simplifying the above equation of Formula 35 using the above equation of Formula 40 gives the following equation.

Formula 41

$$Mrz = -F \cdot \left(\frac{v_p}{\omega} + e\right) \tag{41}$$

Using the above equation of Formula 15 to express the inertia force $F_p$ due to the reciprocating motion mass gives the following equation.

Formula 42

$$F_p = -m \cdot a_p \approx m \cdot r \cdot \omega^2 \cdot \sqrt{1 + \left(\frac{e}{1} + \frac{3r^2 \cdot e}{81^3} + \frac{e^3}{21^3}\right)^2} \cdot$$
$$\cos\left(\omega t - \tan^{-1}\left(\frac{81^3 \cdot e + 3r^2 \cdot e + 4e^3}{81^3}\right)\right) +$$
$$m \cdot r \cdot \omega^2 \cdot \left(\frac{r}{1} + \frac{r^3}{41^3} + \frac{3r \cdot e^2}{21^3}\right) \cdot \cos 2\omega t -$$
$$m \cdot r \cdot \omega^2 \cdot \frac{9r^2 \cdot e}{81^3} \cdot \sin 3\omega t - m \cdot r \cdot \omega^2 \cdot \frac{r^3}{41^3} \cdot \cos 4\omega t \tag{42}$$

The velocity $v_p$ of the piston 32 is expressed by the above equation of Formula 14.

The symbols are defined as follows.

Formula 43

$$\lambda = \frac{1}{r} \tag{43}$$

Formula 44

$$\xi = \frac{e}{r} \tag{44}$$

Formula 45

$$\varepsilon = \sqrt{1 + \left(\frac{e}{1} + \frac{3r^2 \cdot e}{81^3} + \frac{e^3}{21^3}\right)^2} \tag{45}$$

Formula 46

$$\tau = \tan^{-1}\left(\frac{81^2 \cdot e + 3r^2 \cdot e + 4e^3}{81^3}\right) \tag{46}$$

Formula 47

$$\mu = \frac{r}{1} + \frac{r^3}{41^3} + \frac{3r \cdot e^2}{21^3} \tag{47}$$

Formula 48

$$\eta = \frac{9r^2 \cdot e}{81^3} \tag{48}$$

The following relationship is established between $\varepsilon$ and $\tau$ defined by the above equations of Formulas 45 and 46.

Formula 49

$$\varepsilon \cdot \cos\tau = 1 \tag{49}$$

Formula 50

$$\varepsilon \cdot \sin\tau = \tan\tau = \sqrt{\varepsilon^2 - 1} = \frac{e}{1} + \frac{3r^2 \cdot e}{81^3} + \frac{e^3}{21^3} \tag{50}$$

Simplifying the equation for the inertia couple Mrz using the above equations of Formulas 43 to 50 gives the following equation.

Formula 51

$$\frac{Mrz}{m \cdot r^2 \cdot \omega^2} = -\frac{F}{m \cdot r^2 \cdot \omega^2}\left(\frac{v}{\omega} + e\right) = \frac{F}{m \cdot r \cdot \omega^2}\left(-\frac{e}{r} - \frac{v}{r \cdot \omega}\right) \approx$$
$$\left\{\varepsilon \cdot \cos(\omega t - \tau) + \mu \cdot \cos 2\omega t - \eta \cdot \sin 3\omega t - \frac{1}{4\lambda^3} \cdot \cos 4\omega t\right\} \cdot$$
$$\left\{-\xi + \varepsilon \cdot \sin(\omega t - \tau) + \frac{\mu}{2} \cdot \sin 2\omega t + \frac{\eta}{3} \cdot \cos 3\omega t - \frac{1}{16\lambda^3} \cdot \sin 4\omega t\right\} \tag{51}$$

Developing the above equation of Formula 51 and simplifying using the product-sum formula of trigonometric functions gives the following equation.

Formula 52

$$\frac{Mrz}{m \cdot r^2 \cdot \omega^2} \approx$$
$$-\frac{\varepsilon \cdot \mu}{4} \cdot \sin(\omega t + \tau) - \left(\frac{\mu \cdot \eta}{12} + \frac{\eta}{96\lambda^3}\right) \cdot \cos\omega t - \varepsilon \cdot \xi \cdot \cos(\omega t - \tau) +$$
$$\frac{\varepsilon^2}{2} \cdot \sin(2\omega t - 2\tau) + \frac{\mu}{32\lambda^3} \cdot \sin 2\omega t - \frac{\varepsilon \cdot \eta}{3} \cdot \cos(2\omega t + \tau) -$$
$$\xi \cdot \mu \cdot \cos 2\omega t + \frac{3\varepsilon \cdot \mu}{4} \cdot \sin(3\omega t - \tau) + \frac{3\varepsilon}{32\lambda^3} \cdot \sin(3\omega t + \tau) +$$
$$\xi \cdot \eta \cdot \sin 3\omega t + \frac{\mu^2}{4} \cdot \sin 4\omega t + \frac{2\varepsilon \cdot \eta}{3} \cdot \cos(4\omega t - \tau) +$$
$$\frac{\xi}{4\lambda^3} \cdot \cos 4\omega t - \frac{5\varepsilon}{32\lambda^3} \cdot \sin(5\omega t - \tau) + \frac{5\mu \cdot \eta}{12} \cdot \cos 5\omega t -$$
$$\left(\frac{\eta^2}{6} + \frac{3\mu}{32\lambda^3}\right) \cdot \sin 6\omega t - \frac{7\eta}{96\lambda^3} \cdot \cos 7\omega t + \frac{1}{128\lambda^6} \cdot \sin 8\omega t \tag{52}$$

Expressing $\mu$ using $\lambda$ and $\xi$ gives the following equation.

Formula 53

$$\mu = \frac{1}{\lambda} + \frac{1}{4\lambda^3} + \frac{3\xi^2}{2\lambda^3} \tag{53}$$

Expressing η using λ and ξ gives the following equation.

Formula 54

$$\eta = \frac{9\xi}{8\lambda^3} \tag{54}$$

The above equation of Formula 52 is simplified using the above equations of Formulas 53 and 54. As a result, the secondary component is expressed by the following equation.

Formula 55

$$\frac{Mrz2}{m \cdot r^2 \cdot \omega^2} = \frac{\varepsilon^2}{2} \cdot \sin(2\omega t - 2\tau) - \left(\frac{\xi}{\lambda} + \frac{\xi}{4\lambda^3} + \frac{3\xi^3}{2\lambda^3}\right) \cdot \cos 2\omega t - \frac{3\varepsilon \cdot \xi}{8\lambda^3} \cdot \cos(2\omega t + \tau) + \left(\frac{1}{32\lambda^4} + \frac{1}{128\lambda^6} + \frac{3\xi^2}{64\lambda^6}\right) \cdot \sin 2\omega t \tag{55}$$

The above equation of Formula 55 is simplified using the trigonometric function formula to give the following equation.

Formula 56

$$\frac{Mrz2}{m \cdot r^2 \cdot \omega^2} = \left[\frac{\varepsilon^2}{2} \cdot \cos 2\tau + \frac{3\varepsilon \cdot \xi}{8\lambda^3} \cdot \sin \tau + \frac{1}{32\lambda^3}\left(\frac{1}{\lambda} + \frac{1}{4\lambda^3} + \frac{3\xi^2}{2\lambda^3}\right)\right] \cdot \sin 2\omega t - \left[\frac{\varepsilon^2}{2} \cdot \sin 2\tau + \frac{3\varepsilon \cdot \xi}{8\lambda^3} \cdot \cos \tau + \xi \cdot \left(\frac{1}{\lambda} + \frac{1}{4\lambda^3} + \frac{3\xi^2}{2\lambda^3}\right)\right] \cdot \cos 2\omega t \tag{56}$$

Further simplifying the above equation of Formula 56 gives the following equation.

Formula 57

$$\frac{Mrz2}{m \cdot r^2 \cdot \omega^2} = \sqrt{\left(\frac{\varepsilon^2}{2} \cdot \cos 2\tau + \frac{3\varepsilon \cdot \xi}{8\lambda^3} \cdot \sin \tau + \left(\frac{1}{32\lambda^4} + \frac{1}{128\lambda^6} + \frac{3\xi^2}{64\lambda^8}\right)\right)^2 + \left(\frac{\varepsilon^2}{2} \cdot \sin 2\tau + \frac{3\varepsilon \cdot \xi}{8\lambda^3} \cdot \cos \tau + \left(\frac{\xi}{\lambda} + \frac{\xi}{4\lambda^3} + \frac{3\xi^3}{2\lambda^3}\right)\right)^2} \cdot \sin\left(2\omega t - \tan^{-1}\left(\frac{\frac{\varepsilon^2}{2} \cdot \sin 2\tau + \frac{3\varepsilon \cdot \xi}{8\lambda^3} \cdot \cos \tau + \left(\frac{\xi}{\lambda} + \frac{\xi}{4\lambda^3} + \frac{3\xi^3}{2\lambda^3}\right)}{\frac{\varepsilon^2}{2} \cdot \cos 2\tau + \frac{3\varepsilon \cdot \xi}{8\lambda^3} \cdot \sin \tau + \left(\frac{1}{32\lambda^4} + \frac{1}{128\lambda^6} + \frac{3\xi^2}{64\lambda^6}\right)}\right)\right) \tag{57}$$

The symbols are defined as follows.

Formula 58

$$kM = \sqrt{\left(\frac{\varepsilon^2}{2} \cdot \cos 2\tau + \frac{3\varepsilon \cdot \xi}{8\lambda^3} \cdot \sin \tau + \left(\frac{1}{32\lambda^4} + \frac{1}{128\lambda^6} + \frac{3\xi^2}{64\lambda^8}\right)\right)^2 + \left(\frac{\varepsilon^2}{2} \cdot \sin 2\tau + \frac{3\varepsilon \cdot \xi}{8\lambda^3} \cdot \cos \tau + \left(\frac{\xi}{\lambda} + \frac{\xi}{4\lambda^3} + \frac{3\xi^3}{2\lambda^3}\right)\right)^2} \tag{58}$$

Formula 59

$$\phi = -\tan^{-1}\left(\frac{\frac{\varepsilon^2}{2} \cdot \sin 2\tau + \frac{3\varepsilon \cdot \xi}{8\lambda^3} \cdot \cos \tau + \left(\frac{\xi}{\lambda} + \frac{\xi}{4\lambda^3} + \frac{3\xi^3}{2\lambda^3}\right)}{\frac{\varepsilon^2}{2} \cdot \cos 2\tau + \frac{3\varepsilon \cdot \xi}{8\lambda^3} \cdot \sin \tau + \left(\frac{1}{32\lambda^4} + \frac{1}{128\lambda^6} + \frac{3\xi^2}{64\lambda^6}\right)}\right) \tag{59}$$

Simplifying the above equation of Formula 57 using the above equations of Formulas 58 and 59 gives the following.

Formula 60

$$Mrz = kM \cdot mr^2 \omega^2 \cdot \sin(2\omega t + \phi) \tag{60}$$

The above equation of Formula 60 expresses the secondary inertia couple due to the lateral pressure from a single piston generated as this single piston operates. In the engine 14, as the four pistons 32 operate, the secondary inertia couple due to the lateral pressures from the pistons is generated. That is, the secondary inertia couple generated in the engine 14 can be expressed by the following equation of Formula 61.

Formula 61

$$Mrz = 4kM \cdot mr^2 \omega^2 \cdot \sin(2\omega t + \phi) \tag{61}$$

Next, the inertia forces generated as the balancer shafts 40 and 42 rotate will be described. In the following description, the x- and y-directions refer to the x- and y-directions in FIG. 3.

The inertia force generated as the balancer shaft 40 rotates will be designated by Ua, and the inertia force generated as the balancer shaft 42 rotates will be designated by Ub. The components of these inertia forces Ua and Ub in the y-direction suitably satisfy the relationship illustrated by the equation of Formula 62 below. The magnitude of the unbalancing portion 40A of the balancer shaft 40 will be designated by kbA and the magnitude of the unbalancing portion 42A of the balancer shaft 42 will be designated by kbB.

Formula 62

$$Uay + Uby = 4(kbA + kbB) \cdot mr\omega^2 \cdot \cos 2\omega t = -4 \cdot mr\omega^2 \cdot \left(\frac{r}{1} + \frac{r^3}{4\lambda^3} + \frac{3r \cdot e^2}{2\lambda^3}\right) \cdot \cos 2\omega t \tag{62}$$

The position of the shaft center of the balancer shaft 40 will be designated by (xA,yA) and the position of the shaft center of the balancer shaft 42 will be designated by (xB, yB). The position of the shaft center of the crankshaft 30 defines the origin (0,0).

When the moments in the y-direction are in balance, the following equation of Formula 63 is established.

$$xA \cdot 4kbA \cdot mr\omega^2 + xB \cdot 4kbB \cdot mr\omega^2 = 4kM \cdot mr^2\omega^2 \cdot \sin\phi \quad (63)$$

Simplifying the above equation of Formula 63 gives the following equation of Formula 64.

Formula 64

$$xA \cdot kbA + xB \cdot kbB = kM \cdot r \cdot \sin\phi \quad (64)$$

When the crankshaft 30 has rotated by 45° from the reference position ($\theta=0°$), if the inertia force Ua generated as the balancer shaft 40 rotates and the inertia force Ub generated as the balancer shaft 42 rotates are in the relationship illustrated by FIG. 8, the components of these inertia forces Ua and Ub in the x-direction suitably satisfy the relationship illustrated by the equation of Formula 65 below. For ease of explanation, the equation of Formula 65 below uses kb instead of kbA and kbB.

Formula 65

$$Uax = -Ubx = 4kb \cdot mr\omega^2 \cdot \sin 2\omega t \quad (65)$$

If the moments in the x-direction are in balance, the following equation of Formula 66 is established.

$$yA \cdot 4kbA \cdot mr\omega^2 - yB \cdot 4kbB \cdot mr\omega^2 = 4kM \cdot mr^2\omega^2 \cdot \cos\phi \quad (66)$$

Simplifying the above equation of Formula 66 gives the following equation of Formula 67.

Formula 67

$$yA \cdot kbA - yB \cdot kbB = kM \cdot r \cdot \cos\phi \quad (67)$$

When the crankshaft 30 has rotated by 45° from the reference position ($\theta=0°$), if the inertia force Ua generated as the balancer shaft 40 rotates and the inertia force Ub generated as the balancer shaft 42 rotates are in the relationship illustrated by FIG. 9, the components of these inertia forces Ua and Ub in the x-direction suitably satisfy the relationship illustrated by the equation of Formula 68 below. For ease of explanation, the equation of Formula 68 below uses kb instead of kbA and kbB.

Formula 68

$$Uax = -Ubx = -4kb \cdot mr\omega^2 \cdot \sin 2\omega t \quad (68)$$

If the moments in the x-direction are in balance, the following equation of Formula 69 is established.

Formula 69

$$yB \cdot 4kbB \cdot mr\omega^2 - yA \cdot 4kbA \cdot mr\omega^2 = 4kM \cdot mr^2\omega^2 \cdot \cos\phi \quad (69)$$

Simplifying the above equation of Formula 69 gives the following equation of Formula 70.

Formula 70

$$yB \cdot kbB - yA \cdot kbA = kM \cdot r \cdot \cos\phi \quad (70)$$

As is apparent from the above description, if the balancer shaft 40 rotates in the same direction as the crankshaft 30 and the balancer shaft 42 rotates in the direction opposite to that of the crankshaft 30, then, Step 2 may be performed by setting the parameters so as to satisfy Formulas 64 and 67. If the balancer shaft 40 rotates in the direction opposite to that of the crankshaft 30 and the balancer shaft 42 rotates in the same direction as the crankshaft 30, then, Step 2 may be performed by setting the parameters so as to satisfy Formulas 64 and 70.

Next, settings for the balancer shafts 40 and 42 (Step 2) in the configuration shown in FIG. 8, i.e., if the balancer shaft 40 rotates in the same direction as the crankshaft 30 and the balancer shaft 42 rotates in the direction opposite to that of the crankshaft 30, will be described in detail with references to Formulas 64 and 67.

First, a configuration will be described where the magnitude kbA of the unbalancing portion 40A of the balancer shaft 40 and the magnitude kbB of the unbalancing portion 42A of the balancer shaft 42 are the same. In this configuration, both the magnitude of the unbalancing portion 40A and the magnitude of the unbalancing portion 42A will be designated by kb. Then, the following equation of Formula 71 may be derived from the above equation of Formula 64.

Formula 71

$$xA + xB = \frac{kM \cdot r \cdot \sin\phi}{kb} \quad (71)$$

In an offset engine, the piston reaches the top dead center after the crankpin has reached its reference position. As such, $\varphi$ has a negative value, as shown in the above equation of Formula 59. In this configuration, $\sin\varphi < 0$, and thus the right side of the above equation of Formula 71 has a negative value. This means that the distance between the shaft center 40C of the balancer shaft 40 and the reference line L1 as measured in the x-direction (i.e., the absolute value of xA) is larger than the distance between the shaft center 42C of the balancer shaft 42 and the reference line L1 as measured in the x-direction (i.e., absolute value of xB).

Figure 8:
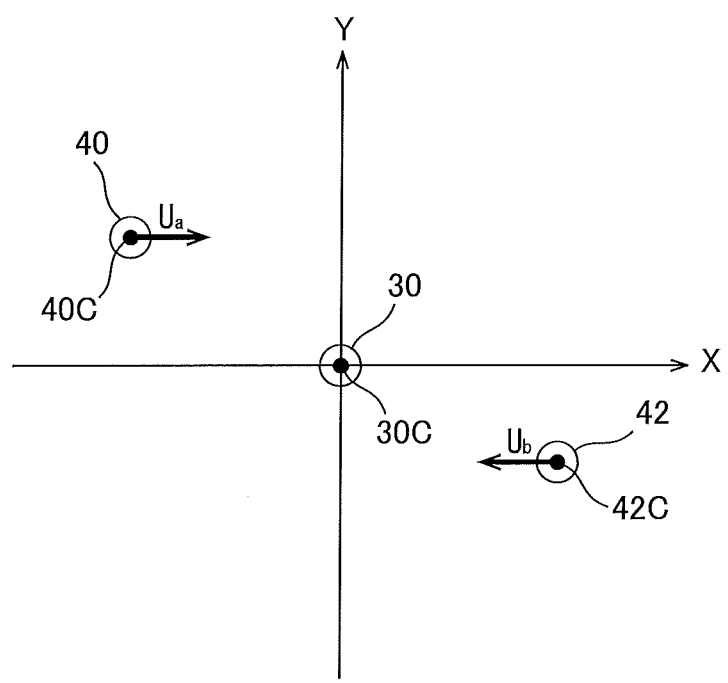
FIG. 8 is a conceptual diagram illustrating the relationship between the inertia forces generated as balancer shafts rotate when a crankshaft has rotated by 45° from a reference position ($\theta=0°$).

If the balancer shaft 40 rotates in the same direction as the crankshaft 30 and the balancer shaft 42 rotates in the direction opposite to that of the crankshaft 30, when the crankshaft 30 has rotated by 45° from its reference position ($\theta=0°$), the inertia force Ua generated as the balancer shaft 40 rotates and the inertia force Ub generated as the balancer shaft 42 rotates are in opposite directions toward each other, as shown in FIG. 8. That is, the inertia force Ua acts in the x-direction away from the balancer shaft 40 toward the balancer shaft 42, while the inertia force Ub acts in the x-direction away from the balancer shaft 42 toward the balancer shaft 40. In this configuration, as shown in FIG. 8, the balancer shaft 40 is located higher than the crankshaft 30, while the balancer shaft 42 is located lower than the crankshaft 30. That is, the balancer shaft 40 that rotates in the same direction as the crankshaft 30 is located higher than the crankshaft 30.

Further, if both the magnitude of the unbalancing portion 40A and the magnitude of the unbalancing portion 42A are designated by kb, then, the following equation of Formula 72 may be derived from the above equation of Formula 67.

Formula 72

$$yA - yB = \frac{kM \cdot r \cdot \cos\phi}{kb} \quad (72)$$

As discussed above, in an offset engine, $\varphi$ has a negative value. Since $\varphi$ is in the range of −90° to 90°, $\cos\varphi > 0$. The right side of the above equation of Formula 72 has a positive value. The above equation of Formula 72 indicates the distance between the shaft center 40C of the balancer shaft 40 and the shaft center 42C of the balancer shaft 42 as measured in the y-direction.

If the balancer shaft 40 rotates in the same direction as the crankshaft 30 and the balancer shaft 42 rotates in the direction opposite to that of the crankshaft 30 and if the magnitude kbA of the unbalancing portion 40A of the balancer shaft 40 and the magnitude kbB of the unbalancing portion 42A of the balancer shaft 42 are the same, then, Step 2 may be performed by positioning the balancer shafts 40 and 42 so as to satisfy Formulas 71 and 72. Then, the balancer 14B will reduce vibration caused by the secondary inertia couple due to the lateral pressures from the pistons even though the phase of the secondary inertia couple caused by the lateral pressures from the pistons is displaced.

Next, a configuration will be described where the distance between the shaft center 40C of the balancer shaft 40 and the shaft center 30C of the crankshaft 30 is equal to the distance between the shaft center 42C of the balancer shaft 42 and the shaft center 30C of the crankshaft 30. In this configuration, the conditions illustrated by the equations of Formulas 73 and 74 below are established.

Formula 73

$$xA = -xB \tag{73}$$

Formula 74

$$yB = -yA \tag{74}$$

Simplifying the equation of Formula 64 using the equation of Formula 73 gives the following equation of Formula 75.

Formula 75

$$kbB - kbA = \frac{kM \cdot r \cdot \sin\phi}{xB} \tag{75}$$

As discussed above, in an offset engine, $\varphi$ has a negative value. In this case, $\sin\varphi < 0$. Further, xB>0. As such, the right side of the above equation of Formula 75 has a negative value. That is, kbA is larger than kbB.

Simplifying the equation of Formula 67 using the equation of Formula 74 gives the following equation of Formula 76.

Formula 76

$$kbA + kbB = \frac{kM \cdot r \cdot \cos\phi}{yA} \tag{76}$$

As discussed above, in an offset engine, $\varphi$ has a negative value. Since $\varphi$ is in the range of −90° to 90°, $\cos\varphi > 0$. Further, yA>0. In this case, the right side of the above equation of Formula 76 has a positive value.

If the balancer shaft 40 rotates in the same direction as the crankshaft 30 and the balancer shaft 42 rotates in the direction opposite to that of the crankshaft 30 and if the distance between the shaft center 40C of the balancer shaft 40 and the shaft center 30C of the crankshaft 30 is equal to the distance between the shaft center 42C of the balancer shaft 42 and the shaft center 30C of the crankshaft 30, then, Step 2 may be performed by positioning the balancer shafts 40 and 42 so as to satisfy Formulas 73 and 76. Then, the balancer 14B will reduce vibration caused by the secondary inertia couple due to the lateral pressures from the pistons even though the phase of the secondary inertia couple caused by the lateral pressures from the pistons is displaced.

If the balancer shafts 40 and 42 are positioned so as to satisfy Formulas 73 to 76, the inertia force generated as the balancer shaft 40 rotates and the inertia force generated as the balancer shaft 42 rotates are not in balance in the x-direction. Accordingly, for example, if the motorcycle includes an auxiliary device such as an oil pump or water pump that rotates at a speed twice that of the crankshaft 30, an additional unbalancing portion may be provided on their shafts to balance the inertia forces in the x-direction.

Next, settings for the balancer shafts 40 and 42 (Step 2) in the configuration shown in FIG. 9, i.e., if the balancer shaft 40 rotates in the direction opposite to that of the crankshaft 30 and the balancer shaft 42 rotates in the same direction as the crankshaft 30, will be described in detail with reference to the above equations of Formulas 64 and 70.

If the magnitude kbA of the unbalancing portion 40A of the balancer shaft 40 and the magnitude kbB of the unbalancing portion 42A of the balancer shaft 42 are the same, then, the relationship between xA and xB satisfies the above equation of Formula 71, as in configurations where the balancer shaft 40 rotates in the same direction as the crankshaft 30 and the balancer shaft 42 rotates in the direction opposite to that of the crankshaft 30. Accordingly, the description for deriving the equation of Formula 71 will not be repeated.

Figure 9:
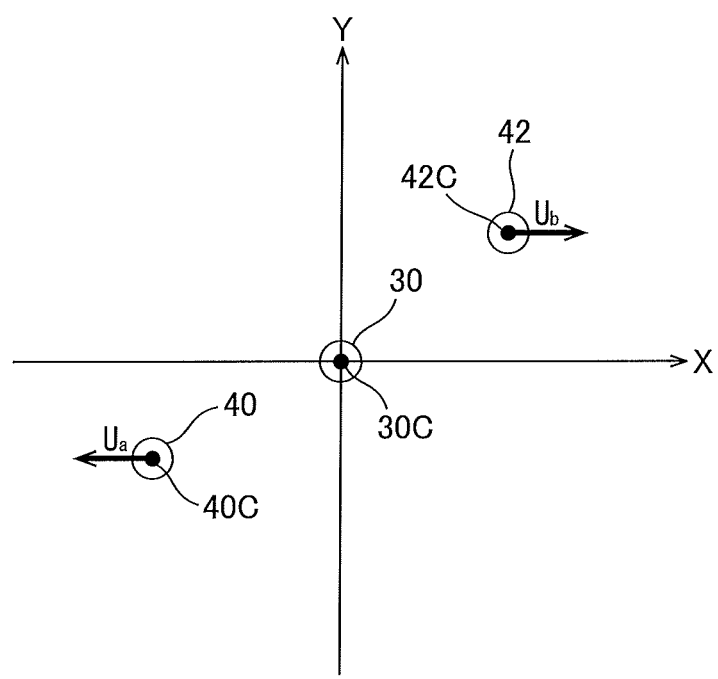
FIG. 9 is a conceptual diagram illustrating the relationship between the inertia forces generated as balancer shafts rotate when a crankshaft has rotated by 45° from a reference position ($\theta=0°$), where the balancer shafts are arranged differently from those in FIG. 8.

If the balancer shaft 40 rotates in the direction opposite to that of the crankshaft 30 and the balancer shaft 42 rotates in the same direction as the crankshaft 30, when the crankshaft 30 has rotated by 45° from its reference position ($\theta = 0°$), the inertia force Ua generated as the balancer shaft 40 rotates and the inertia force Ub generated as the balancer first 42 rotates are in opposite directions away from each other, as shown in FIG. 9. That is, the inertia force Ua acts in the x-direction away from the balancer shaft 42 toward the balancer shaft 40, while the inertia force Ub acts in the x-direction away from the balancer shaft 40 toward the balancer shaft 42. In this configuration, as shown in FIG. 9, the balancer shaft 40 is located lower than the crankshaft 30, while the balancer shaft 42 is located higher than the crankshaft 30. That is, the balancer shaft 42 that rotates in the same direction as the crankshaft 30 is located higher than the crankshaft 30.

If both the magnitude of the unbalancing portion 40A and the magnitude of the unbalancing portion 42A are designated by kb, the following equation of Formula 77 can be derived from the above equation of Formula 70.

Formula 77

$$yB - yA = \frac{kM \cdot r \cdot \cos\phi}{kb} \tag{77}$$

As discussed above, in an offset engine, $\varphi$ has a negative value. Since $\varphi$ is in the range of −90° to 90°, $\cos\varphi > 0$. In this case, the right side of the above equation of Formula 77 has a positive value. The above equation of Formula 77 indicates the distance between the shaft center 40C of the balancer shaft 40 and the shaft center 42C of the balancer shaft 42 as measured in the y-direction.

If the balancer shaft 40 rotates in the direction opposite to that of the crankshaft 30 and the balancer shaft 42 rotates in the same direction as the crankshaft 30 and if the magnitude kbA of the unbalancing portion 40A of the balancer shaft 40 and the magnitude kbB of the unbalancing portion 42A of the balancer shaft 42 are the same, then, Step 2 may be performed by positioning the balancer shafts 40 and 42 so as to satisfy Formulas 71 and 72. Then, the balancer 14B will reduce vibration caused by the secondary inertia couple due to the lateral pressures from the pistons even though the phase of the secondary inertia couple caused by the lateral pressures from the pistons is displaced.

Next, a configuration where the distance between the shaft center 40C of the balancer shaft 40 and the shaft center 30C of the crankshaft 30 is equal to the distance between the shaft center 42C of the balancer shaft 42 and the shaft center 30C of the crankshaft 30 will be described. In this configuration, the conditions indicated by Formulas 73 and 74 are established.

Simplifying the equation of Formula 64 using the equation of Formula 73 gives the above equation of Formula 75. That is, kbA is larger than kbB, as in configurations where the balancer shaft 40 rotates in the same direction as the crankshaft 30 and the balancer shaft 42 rotates in the direction opposite to the crankshaft 30 and if the distance between the shaft center 40C of the balancer shaft 40 and the shaft center 30C of the crankshaft 30 is equal to the distance between the shaft center 42C of the balancer shaft 42 and the shaft center 30C of the crankshaft 30.

Simplifying the equation of Formula 70 using the equation of Formula 74 gives the following equation of Formula 78.

Formula 78

$$kbB + kbA = -\frac{kM \cdot r \cdot \cos\phi}{yA} \quad (78)$$

As discussed above, in an offset engine, $\varphi$ has a negative value. Since $\varphi$ is in the range of $-90°$ to $90°$, $\cos \varphi > 0$. Further, yA<0. In this case, the right side of the above equation of Formula 78 has a positive value.

If the balancer shaft 40 rotates in the direction opposite to that of the crankshaft 30 and the balancer shaft 42 rotates in the same direction as the crankshaft 30 and if the distance between the shaft center 40C of the balancer shaft 40 and the shaft center 30C of the crankshaft 30 is equal to the distance between the shaft center 42C of the balancer shaft 42 and the shaft center 30C of the crankshaft 30, then, Step 2 may be performed by positioning the balancer shafts 40 and 42 so as to satisfy Formulas 73 to 75 and 78. Then, the balancer 14B will reduce vibration caused by the secondary inertia couple due to the lateral pressures from the pistons even though the phase of the secondary inertia couple caused by the lateral pressures from the pistons is displaced.

If the balancer shafts 40 and 42 are positioned so as to satisfy Formulas 73 to 75 and 78, the inertia force generated as the balancer shaft 40 rotates and the inertia force generated as the balancer shaft 42 rotates are not in balance in the x-direction. Accordingly, for example, if the motorcycle includes an auxiliary device such as an oil pump or water pump that rotates at a speed twice that of the crankshaft 30, an additional unbalancing portion may be provided on their shafts to balance the inertia forces in the x-direction.

Although preferred embodiments of the present invention have been described, these preferred embodiments are merely examples for carrying out the present invention. Therefore, the present invention is not limited to the above-illustrated preferred embodiments, and the above-illustrated preferred embodiments may be modified appropriately without departing from the spirit of the invention.

For example, the pistons 32 may have different offset quantities.

The above preferred embodiments describe configurations where the distance between the shaft center 40C of the balancer shaft 40 and the shaft center 30C of the crankshaft 30 as measured in the x-direction is equal or substantially equal to the distance between the shaft center 42C of the balancer shaft 42 and the shaft center 30C of the crankshaft 30 as measured in the x-direction by describing configurations where the distance between the shaft center 40C of the balancer shaft 40 and the shaft center 30C of the crankshaft 30 as measured in the y-direction is equal or substantially equal to the distance between the shaft center 42C of the balancer shaft 42 and the shaft center 30C of the crankshaft 30 as measured in the y-direction; alternatively, the distance between the shaft center 40C of the balancer shaft 40 and the shaft center 30C of the crankshaft 30 as measured in the y-direction may be different from the distance between the shaft center 42C of the balancer shaft 42 and the shaft center 30C of the crankshaft 30 as measured in the y-direction.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. An in-line four cylinder engine comprising:
 a motion converter including:
  a crankshaft;
  four pistons each located within an associated one of four cylinders arranged in an axial direction of the crankshaft; and
  four connecting rods each swingably connected to an associated one of the four pistons and swingably connected to the crankshaft; wherein
  the crankshaft includes four crankpins each mounted on an associated one of the four connecting rods;
  the four cylinders have cylinder axes that are parallel or substantially parallel to each other;
  when two of the four crankpins located at ends of a series of crankpins arranged in the axial direction of the crankshaft are at predetermined reference positions, the other two crankpins are located on a side of a shaft center of the crankshaft which is opposite to a side with the reference positions;
  as viewed in the axial direction of the crankshaft, the shaft center of the crankshaft is not located on the cylinder axes of the four cylinders;
  for each of the four pistons, an angle of rotation of the crankshaft when the piston moves from a top dead center to a bottom dead center is larger than an angle of rotation of the crankshaft when the piston moves from the bottom dead center to the top dead center; and
 a balancer that reduces vibration generated as the motion converter operates, the balancer including:
  a first balancer shaft parallel or substantially parallel to the crankshaft and that rotates at a speed twice that at which the crankshaft rotates; and
  a second balancer shaft parallel or substantially parallel to the crankshaft and that rotates at a speed twice that at which the crankshaft rotates in a direction opposite to that in which the first balancer shaft rotates; wherein a reference line passes through the shaft center of the crankshaft and is parallel or substantially parallel to the cylinder axes of the four cylinders as viewed in the axial direction of the crankshaft;

as viewed in the axial direction of the crankshaft, the first balancer shaft is located on a side of the reference line which is opposite to a side with the second balancer shaft at a position different from that of the second balancer shaft as measured in a first direction in which the reference line extends;

the first balancer shaft includes a first unbalancing portion that generates an inertia force as the first balancer shaft rotates;

the second balancer shaft includes a second unbalancing portion that generates an inertia force as the second balancer shaft rotates; and at least one of the following (1) and (2) applies so as to reduce vibrations generated by a secondary component of an inertia couple based on lateral pressures from the four pistons:

(1) a distance between a shaft center of the first balancer shaft and the reference line as measured in a second direction is different from a distance between a shaft center of the second balancer shaft and the reference line as measured in the second direction; and (2) a magnitude of the first unbalancing portion is different from a magnitude of the second unbalancing portion; wherein the first direction is a direction in which the reference line extends as viewed in the axial direction of the crankshaft, and the second direction is a direction perpendicular to the first direction.

2. The in-line four cylinder engine according to claim 1, wherein the distance between the shaft center of the first balancer shaft and the reference line as measured in the second direction is different from the distance between the shaft center of the second balancer shaft and the reference line as measured in the second direction.

3. The in-line four cylinder engine according to claim 2, wherein:

the magnitude of the first unbalancing portion is equal or substantially equal to the magnitude of the second unbalancing portion;

one of the first and second balancer shafts is located on a side of the reference line which is opposite to a side with cylinder axes of the four cylinders, and the other one of the first and second balancer shafts is located on the side of the reference line on which cylinder shafts of the four cylinders are located; and as viewed in the axial direction of the crankshaft, the distance between the shaft center of the other one of the first and second balancer shafts and the reference line as measured in the second direction is larger than the distance between the shaft center of the one of the first and second balancer shafts and the reference line as measured in the second direction.

4. The in-line four cylinder engine according to claim 1, wherein the magnitude of the first unbalancing portion is different from the magnitude of the second unbalancing portion.

5. The in-line four cylinder engine according to claim 1, wherein:

one of the first and second balancer shafts rotates in the same direction in which the crankshaft rotates while the other one of the first and second balancer shafts rotates in a direction opposite to that in which the crankshaft rotates; and as viewed in the axial direction of the crankshaft, the one of the first and second balancer shafts is located closer to the four pistons than the other one of the first and second balancer shafts is as measured in the first direction.

6. The in-line four cylinder engine according to claim 1, wherein, as viewed in the axial direction of the crankshaft, distances between the shaft center of the crankshaft and the cylinder axes of the four cylinders as measured in the second direction are equal to each other.

7. A straddled vehicle comprising the in-line four cylinder engine according to claim 1.

* * * * *